United States Patent
Rekimoto

(10) Patent No.: US 8,417,284 B2
(45) Date of Patent: Apr. 9, 2013

(54) LOCATION NOTIFICATION METHOD, LOCATION NOTIFICATION SYSTEM, INFORMATION PROCESSING APPARATUS, WIRELESS COMMUNICATION APPARATUS AND PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 13/064,152

(22) Filed: Mar. 8, 2011

(65) Prior Publication Data

US 2011/0165910 A1    Jul. 7, 2011

Related U.S. Application Data

(62) Division of application No. 12/105,118, filed on Apr. 17, 2008, now Pat. No. 8,010,135.

(30) Foreign Application Priority Data

Apr. 18, 2007 (JP) ................ P2007-109830

(51) Int. Cl.
   *H04M 1/00* (2006.01)
(52) U.S. Cl. ............... 455/550.1; 455/556.1; 455/456.1; 370/328
(58) Field of Classification Search ............... 455/550.1, 455/456.5, 561, 556.1; 370/328
See application file for complete search history.

(56) References Cited

U.S. PATENT DOCUMENTS

| 6,636,249 | B1 | 10/2003 | Rekimoto |
| 7,495,608 | B1 * | 2/2009 | Chen et al. ............... 342/357.43 |
| 2005/0119011 | A1 * | 6/2005 | Sakamoto et al. ......... 455/456.3 |
| 2009/0082021 | A1 * | 3/2009 | Matsuzawa et al. .......... 455/436 |

FOREIGN PATENT DOCUMENTS

| JP | 2000-194726 | 7/2000 |
| JP | 2001-136576 | 5/2001 |
| JP | 2001-320340 | 11/2001 |
| JP | 2004-134951 | 4/2004 |
| WO | WO 2007/040320 A1 | 4/2007 |

* cited by examiner

*Primary Examiner* — Danh Le
(74) *Attorney, Agent, or Firm* — Finnegan, Henderson, Farabow, Garrett & Dunner, L.L.P.

(57) ABSTRACT

There is provided a wireless communication apparatus including a base station information input portion to input base station information of a base station transmitting a radio wave having a wave reaching range including a particular location, the base station information acquired from a first memory storing a plurality of pieces of base station information containing a base station ID, a recording portion to record the base station information input to the base station information input portion into a second memory placed in the wireless communication apparatus, a reception portion to receive the radio wave transmitted from a surrounding base station, and a notification processing portion to perform prescribed notification processing based on a determination result whether the wireless communication apparatus exists in the particular location.

13 Claims, 12 Drawing Sheets

FIG.6

| BASE STATION ID | LONGITUDE | LATITUDE |
|---|---|---|
| 30A | 135.001 | 35.49 |
| 30B | 135.002 | 35.41 |
| 30C | 138.003 | 34.50 |
| 30D | 130.002 | 37.42 |
| ⋮ | ⋮ | ⋮ |
| 30H | 132.664 | 36.42 |
| 30I | 135.003 | 35.50 |
| ⋮ | ⋮ | ⋮ |
| 30X | 135.002 | 35.42 |
| 30Y | 132.091 | 34.22 |
| ⋮ | ⋮ | ⋮ |

FIG.7

| BASE STATION ID | LONGITUDE | LATITUDE |
|---|---|---|
| 30A | 135.001 | 35.49 |
| 30B | 135.002 | 35.41 |
| 30I | 135.003 | 35.50 |
| 30X | 135.002 | 35.42 |

FIG.8

| BASE STATION ID | RECEPTION STRENGTH |
|---|---|
| 30B | −90Dbm |
| 30F | −75Dbm |
| ⋮ | ⋮ |
| 30I | −84Dbm |
| 30J | −82Dbm |
| ⋮ | ⋮ |
| 30X | −77Dbm |

REMINDER

YOU ARE ARRIVED AT THE
DESIGNATED LOCATION.
PLEASE REMEMBER TO
BUY A NOTEBOOK

FIG.14

| STAR BOOKS 5P | | FIRST GRILL 4P | | SEVEN-TEN 2P | |
|---|---|---|---|---|---|
| BASE STATION ID | RECEPTION STRENGTH | BASE STATION ID | RECEPTION STRENGTH | BASE STATION ID | RECEPTION STRENGTH |
| 30A | −90Dbm | 30E | −82Dbm | 30I | −76Dbm |
| 30B | −70Dbm | 30F | −73Dbm | 30J | −80Dbm |
| 30C | −80Dbm | 30G | −80Dbm | 30K | −80Dbm |
| 30D | −75Dbm | 30H | −77Dbm | 30L | −78Dbm |
| ... | | ... | ... | ... | ... |

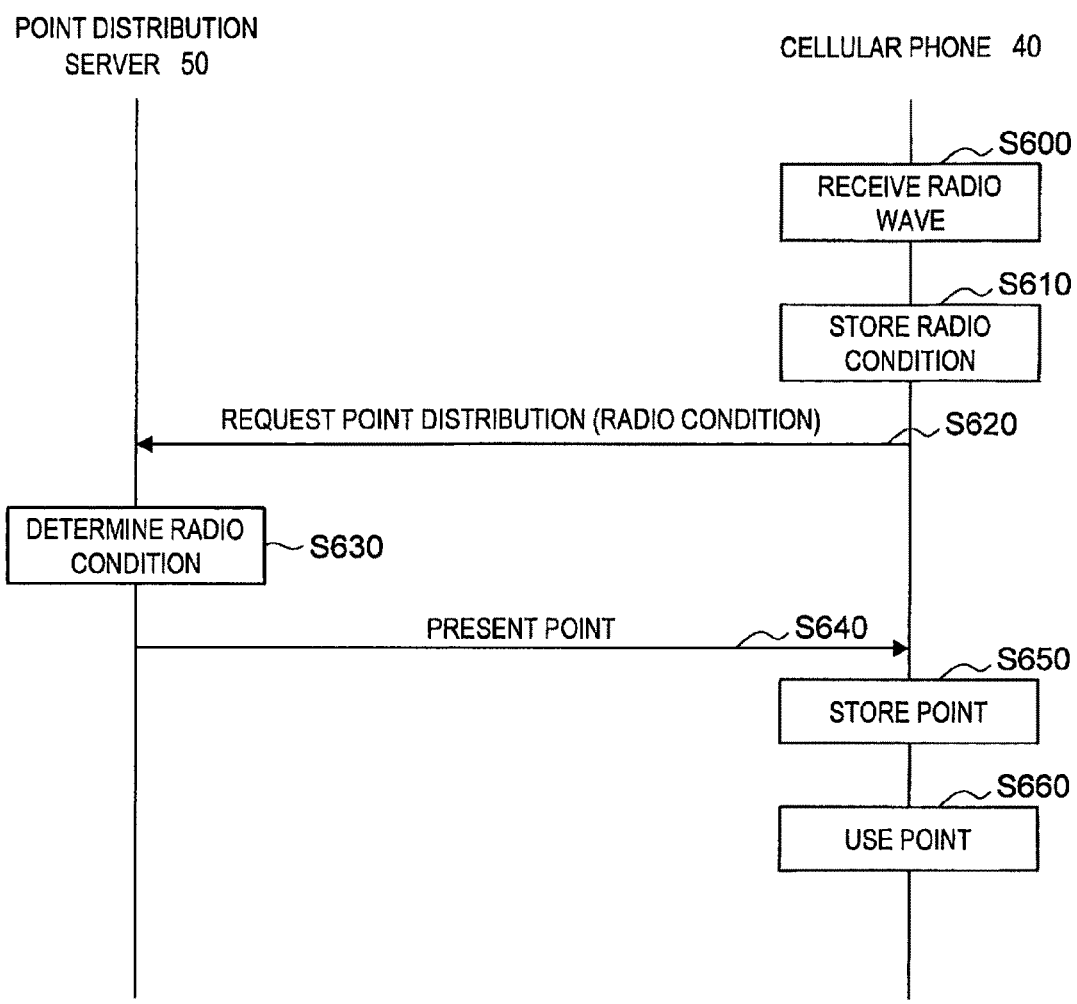

US 8,417,284 B2

LOCATION NOTIFICATION METHOD, LOCATION NOTIFICATION SYSTEM, INFORMATION PROCESSING APPARATUS, WIRELESS COMMUNICATION APPARATUS AND PROGRAM

This application is a divisional of application Ser. No. 12/105,118, filed on Apr. 17, 2008 now U.S. Pat. No. 8,010,135, which claims the benefit of priority from prior Japanese Patent Application No. JP 2007-109830, filed in Japan Patent Office on Aug. 18, 2007, the entire contents of which are incorporated herein by reference.

CROSS REFERENCES TO RELATED APPLICATIONS

The present invention contains subject matter related to Japanese Patent Application JP 2007-109830 filed in the Japan Patent Office on Apr. 18, 2007, the entire contents of which being incorporated herein by reference.

BACKGROUND OF THE INVENTION

1. Field of the Invention

The present invention relates to a location notification method, a location notification system, an information processing apparatus, a wireless communication apparatus and a program.

2. Description of the Related Art

A person takes some measures to help his/her memory, such as making a memo or storing things to remember in a computer. For example, a person can make a memo which indicates a remainder item such as "buy a notebook in a convenience store" or "stop by the gallery ABC on occasion to visit Kinza town next week".

However, a person needs to remember each reminder item in a particular context (situation). For example, a person needs to remember that he/she should "buy a notebook" at the time "before arriving at the workplace tomorrow" in the vicinity of the place "a convenience store". In other words, a person preferably remembers each reminder item in an appropriate time and place.

Japanese Unexamined Patent Application Publication No. 2000-194726, for example, discloses a technique which is accomplished in light of the above issue. According to this technique, an information processing apparatus estimates its location using GPS (Global Positioning System), for example, and, if the information processing apparatus estimates that it is in a prescribed location, it notifies given information to a user of the information processing apparatus.

SUMMARY OF THE INVENTION

However, when an existing information processing apparatus estimates its own location based on a WiFi (Wireless Fidelity) wave which is transmitted from a surrounding base station, it is necessary for the information processing apparatus to store the location information of a large number of base stations in light of the possibility that the information processing apparatus is brought to various places. This causes an increase in the memory capacity of the information processing apparatus which is necessary for storing the location information of base stations.

In light of the foregoing, there is a need for new, improved location notification method, location notification system, information processing apparatus, wireless communication apparatus and program which are capable of performing prescribed notification processing according to an existing location with a reduced amount of stored information on base stations.

According to an embodiment of the present invention, there is provided a location notification method which includes the steps of inputting location information indicating a given location, acquiring base station information, which contains a base station ID, of a base station transmitting a radio wave having a wave reaching range including the location indicated by the location information from a first memory storing a plurality of pieces of base station information of base stations, recording the base station information acquired from the first memory into a second memory placed in a wireless communication apparatus, receiving a radio wave containing a base station ID from a surrounding base station by the wireless communication apparatus, determining whether the wireless communication apparatus exists in the location indicated by the location information based on the radio wave received by the wireless communication apparatus and the base station information stored in the second memory, and performing prescribed notification processing based on a determination result whether the wireless communication apparatus exists in the location indicated by the location information.

According to another embodiment of the present invention, there is provided a location notification system which includes a wireless communication apparatus capable of receiving a radio wave containing a base station ID transmitted from a base station of wireless communication, and an information processing apparatus connected with the wireless communication apparatus. Specifically, the information processing apparatus includes a location information input portion to input location information indicating a given location, an acquisition portion to acquire base station information, which contains a base station ID, of a base station transmitting a radio wave having a wave reaching range including the location indicated by the location information input to the location information input portion from a first memory storing a plurality of pieces of base station information of base stations, and an output portion to output the base station information acquired by the acquisition portion to the wireless communication apparatus. The wireless communication apparatus includes a base station information input portion to input the base station information output from the output portion, a recording portion to record the base station information input to the base station information input portion into a second memory placed in the wireless communication apparatus, a reception portion to receive the radio wave transmitted from a surrounding base station, a determination portion to determine whether the wireless communication apparatus exists in the location indicated by the location information based on the radio wave received by the reception portion and the base station information stored in the second memory, and a notification processing portion to perform prescribed notification processing based on a determination result of the determination portion whether the wireless communication apparatus exists in the location indicated by the location information.

In this configuration, the acquisition portion acquires the base station information of the base station which transmits the radio wave that reaches the particular location indicated by the location information input to the location information input portion. The base station information may include a base station ID and location information indicating the location of a base station. The acquisition portion then acquires the base station information of the base station which transmits the radio wave that reaches the particular location from the first memory storing a plurality of pieces of base station information. Then, the output portion outputs the base station information which is acquired by the acquisition portion to the wireless communication apparatus. The base station information is input to the base station information input portion of the wireless communication apparatus, and the recording portion records the base station information of the base station which transmits the radio wave having a wave reaching range including the particular location into the second memory. Then, the determination portion determines whether the wireless communication apparatus exists in the particular location based on the radio wave which is transmitted from a surrounding base station and the base station information which is stored in the second memory. For example, the determination portion estimates the location of the wireless communication apparatus based on the radio wave which is transmitted from a surrounding base station and the base station information containing location information of each base station which is stored in the second memory, and determines whether the estimated location corresponds to the particular location. Then, the notification processing portion performs prescribed notification processing based on a determination result of the determination portion as to whether the wireless communication apparatus exists in the particular location. For example, the notification processing portion notifies a user of the wireless communication apparatus that the wireless communication apparatus exists in the particular location when the determination portion determines that the wireless communication apparatus exists in the particular location.

The base station information which is input to the base station information input portion is selectively acquired by the acquisition portion of the information processing apparatus from the first memory which stores a plurality of pieces of base station information. Thus, the base station information which is necessary to determine whether the wireless communication apparatus exists in a particular location is selectively recorded in the second memory. The data amount of the base station information which is stored in the second memory of the wireless communication apparatus is thereby reduced, so that the wireless communication apparatus can perform prescribed notification processing according to the existing location of the wireless communication apparatus with a small hardware scale.

According to another embodiment of the present invention, there is provided an information processing apparatus connected with a wireless communication apparatus capable of receiving a radio wave containing a base station ID transmitted from a base station of wireless communication, which includes a location information input portion to input location information indicating a given location, an acquisition portion to acquire base station information, which contains a base station ID, of a base station transmitting a radio wave having a wave reaching range including the location indicated by the location information input to the location information input portion from a first memory storing a plurality of pieces of base station information of base stations, and an output portion to output the base station information acquired by the acquisition portion to the wireless communication apparatus.

In this configuration, the acquisition portion acquires the base station information of the base station which transmits the radio wave that reaches the particular location indicated by the location information input to the location information input portion. The base station information may include a base station ID and location information indicating the location of a base station. The acquisition portion then acquires the base station information of the base station which transmits the radio wave that reaches the particular location from the first memory storing a plurality of pieces of base station information. Then, the output portion outputs the base station information which is acquired by the acquisition portion to the wireless communication apparatus. The determination as to whether the wireless communication apparatus exists in the particular location may be performed based on the reception condition (e.g. the reception strength of the radio wave for each base station) of the radio wave that reaches the particular location in the wireless communication apparatus. Thus, the information processing apparatus selectively outputs the base station information of the base station which transmits the radio wave that reaches the particular location to the wireless communication apparatus, thereby allowing the wireless communication apparatus to determine whether it is in the particular location based on the base station information that is input from the information processing apparatus.

According to another embodiment of the present invention, there is provided a program for causing a computer to serve as an information processing apparatus connected with a wireless communication apparatus capable of receiving a radio wave containing a base station ID transmitted from a base station of wireless communication. Specifically, the information processing apparatus includes a location information input portion to input location information indicating a given location, an acquisition portion to acquire base station information, which contains a base station ID, of a base station transmitting a radio wave having a wave reaching range including the location indicated by the location information input to the location information input portion from a first memory storing a plurality of pieces of base station information of base stations, and an output portion to output the base station information acquired by the acquisition portion to the wireless communication apparatus The above program can cause a hardware resource of a computer including CPU, ROM, RAM or the like to execute the functions of each element of the location information input portion, the acquisition portion and the output portion described above. It is therefore possible to cause a computer that implements the program to serve as the above-described information processing apparatus.

According to another embodiment of the present invention, there is provided a wireless communication apparatus capable of receiving a radio wave containing a base station ID transmitted from a base station of wireless communication, which includes a base station information input portion to input base station information of a base station transmitting a radio wave having a wave reaching range including a particular location, the base station information acquired from a first memory storing a plurality of pieces of base station information containing a base station ID, a recording portion to record the base station information input to the base station information input portion into a second memory placed in the wireless communication apparatus, a reception portion to receive the radio wave transmitted from a surrounding base station, a determination portion to determine whether the wireless communication apparatus exists in the particular location based on the radio wave received by the reception portion and the base station information stored in the second memory, and a notification processing portion to perform prescribed notification processing based on a determination result of the determination portion whether the wireless communication apparatus exists in the particular location.

In this configuration, the recording portion records the base station information of the base station which transmits the radio wave having a wave reaching range including the particular location input to the location information input portion into the second memory. Then, the determination portion determines whether the wireless communication apparatus exists in the particular location based on the radio wave which is transmitted from a surrounding base station and the base station information which is stored in the second memory. For example, the determination portion estimates the location of the wireless communication apparatus based on the radio wave which is transmitted from a surrounding base station and the base station information containing location information of each base station which is stored in the second memory, and determines whether the estimated location corresponds to the particular location. Then, the notification processing portion performs prescribed notification processing based on a determination result of the determination portion as to whether the wireless communication apparatus exists in the particular location. For example, the notification processing portion notifies a user of the wireless communication apparatus that the wireless communication apparatus exists in the particular location when the determination portion determines that the wireless communication apparatus exists in the particular location.

The base station information which is input to the base station information input portion is selectively acquired from the first memory which stores a plurality of pieces of base station information. Thus, the base station information which is necessary to determine whether the wireless communication apparatus exists in a particular location is selectively recorded in the second memory. The data amount of the base station information which is stored in the second memory of the wireless communication apparatus is thereby reduced, so that the wireless communication apparatus can perform prescribed notification processing according to the existing location of the wireless communication apparatus with a small hardware scale.

In the above wireless communication apparatus, the reception portion may receive the radio wave transmitted from the surrounding base station at a prescribed frequency. This configuration eliminates the necessity for the reception portion to operate at all times, thereby reducing the power consumption in the wireless communication apparatus.

The wireless communication apparatus may further include a distance evaluation portion to evaluate a distance between a location of the wireless communication apparatus and the particular location based on the radio wave received by the reception portion and the base station information stored in the second memory, and the reception portion may reduce a frequency of receiving the radio wave transmitted from the surrounding base station as the distance between the location of the wireless communication apparatus and the particular location evaluated by the distance evaluation portion is longer. Generally, as a distance between the location of the wireless communication apparatus and the particular location is larger, a time that is necessary for the wireless communication apparatus to reach the particular location is longer. Thus, the frequency of receiving the radio wave transmitted from the surrounding base station may be reduced as the distance between the location of the wireless communication apparatus and the particular location evaluated by the distance evaluation portion is longer. This configuration further reduces the power consumption in the wireless communication apparatus while maintaining the accuracy of determination as to whether the wireless communication apparatus exists in the particular location.

The wireless communication apparatus may further include a time information input portion to input time information indicating a given time, and the determination portion may determine whether the wireless communication apparatus exists in the particular location at the time indicated by the time information input to the time information input portion. In this configuration, the notification processing portion performs prescribed notification processing when the determination portion determines that the wireless communication apparatus exists in the particular location at the time indicated by the time information that is input to the time information input portion. The notification processing portion can thereby perform prescribed notification processing in more appropriate context in accordance with the location of the wireless communication apparatus and the time.

The wireless communication apparatus may further include a notification information input portion to input notification information to be notified to a user of the wireless communication apparatus, and the notification processing portion may perform notification processing of the notification information input to the notification information input portion when the determination portion determines that the wireless communication apparatus exists in the particular location. In this configuration, when the wireless communication apparatus exists in the particular location, the notification processing portion can notify a user of the wireless communication apparatus not only that the wireless communication apparatus exists in the particular location but also the notification information which is input in advance. Consequently, when the user of the wireless communication apparatus reaches the particular location, the user can remember that he/she reaches the particular location and the item related to the particular location based on the notification information.

The wireless communication apparatus may further include a location information input portion to input location information indicating the particular location, and an acquisition portion to acquire base station information of a base station transmitting a radio wave having a wave reaching range including the particular location indicated by the location information input to the location information input portion, from the first memory. This configuration allows the wireless communication apparatus to perform the process such as the input of a particular location, the acquisition of the base station information of the base station which transmits the radio wave with its wave reaching range including the particular location from the first memory, and the prescribed notification processing on its own.

According to another embodiment of the present invention, there is provided a program for causing a computer to serve as a wireless communication apparatus capable of receiving a radio wave containing a base station ID transmitted from a base station of wireless communication. Specifically, the wireless communication apparatus includes a base station information input portion to input base station information of a base station transmitting a radio wave having a wave reaching range including a particular location, the base station information acquired from a first memory storing a plurality of pieces of base station information containing a base station ID, a recording portion to record the base station information input to the base station information input portion into a second memory, a reception portion to receive the radio wave transmitted from a surrounding base station, a determination portion to determine whether the wireless communication apparatus exists in the particular location based on the radio wave received by the reception portion and the base station information stored in the second memory, and a notification processing portion to perform prescribed notification processing based on a determination result of the determination portion whether the wireless communication apparatus exists in the particular location.

The above program can cause a hardware resource of a computer including CPU, ROM, RAM or the like to execute the functions of each element of the recording portion, the determination portion and the notification processing portion described above. It is therefore possible to cause a computer that implements the program to serve as the above-described wireless communication apparatus.

According to the embodiments of the present invention described above, it is possible to perform prescribed notification processing according to an existing location with a reduced amount of stored information relating to base stations.

BRIEF DESCRIPTION OF THE DRAWINGS

FIG. 6 is an illustration showing an example of base station information which is stored in a storage portion of a PC.

FIG. 7 is an illustration showing an example of base station information which is acquired from a storage portion by an information acquisition portion.

FIG. 8 is an illustration showing an example of the reception strength of a signal received from surrounding base stations by a portable device.

FIG. 9 is an illustration showing an example of notification of a reminder item which is notified by a notification portion.

FIG. 14 is an illustration showing an example of the information which is stored in a storage portion.

FIG. 15 is an illustration showing the flow of a point distribution method which is executed in a cellular phone and a point distribution server according to the second embodiment.

DETAILED DESCRIPTION OF THE PREFERRED EMBODIMENTS

Figure 1:
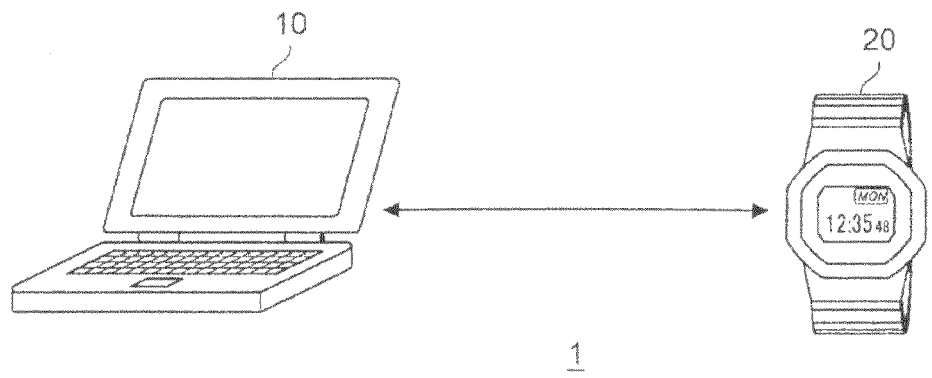
FIG. 1 is an illustration showing the configuration of a location notification system according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 2:
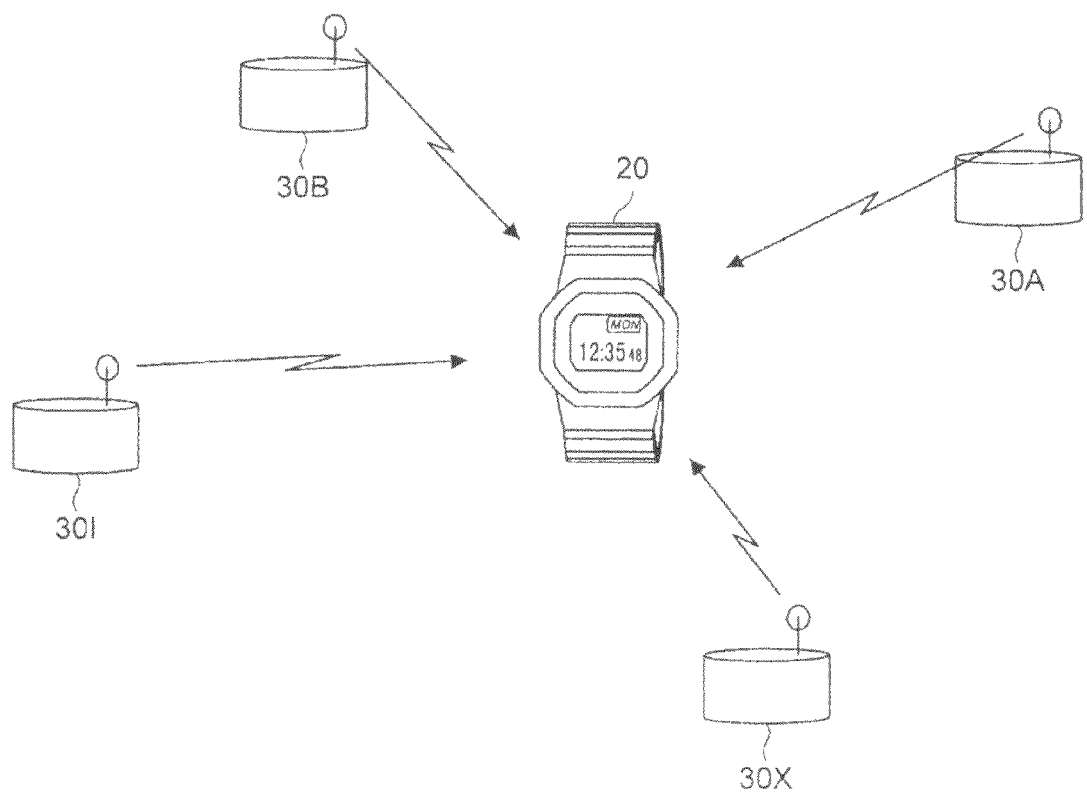
FIG. 2 is an illustration showing the relationship of a portable device with surrounding base stations according to the embodiment.

Preferred embodiments of the present invention will be described in the following order:

(1) Description of the outline of the location notification system (2) Description of the first embodiment of the present invention (2-1) Hardware configuration of the portable device according to the first embodiment of the present invention (2-2) Function of the PC and the portable device according to the first embodiment of the present invention (2-3) Wireless communication method according to the first embodiment of the present invention (2-4) Alternative embodiment of the first embodiment of the present invention (3) Description of the second embodiment of the present invention (3-1) Function of the point distribution server and the cellular phone according to the second embodiment of the present invention (3-2) Point distribution method according to the second embodiment of the present invention (4) Summary (1) Description of the Outline of the Location Notification System The outline of a location notification system 1 according to an embodiment of the present invention is described hereinafter with reference to FIGS. 1 and 2.

FIG. 1 is an illustration showing the configuration of the location notification system 1 according to the embodiment. FIG. 2 is an illustration showing the relationship of a portable device with surrounding base stations according to the embodiment. As shown in FIG. 1, the location notification system 1 of this embodiment includes a PC (Personal Computer) 10 and a portable device 20. As shown in FIG. 2, the portable device 20 receives signals which are transmitted from the surrounding base stations 30.

When the portable device 20 receives signals (radio waves) which are transmitted from the surrounding base stations 30A, 30B, 30I and 30X as shown in FIG. 2, the portable device 20 can estimate the location of the portable device 20 if it has base station information which contains the location information of the surrounding base stations 30A, 30B, 30I and 30X. Thus, the portable device 20 can estimate its own location in the vicinity of the location of the base station 30 corresponding to the base station information which is stored therein. Therefore, if the base station information of the base stations which are installed in all places are stored in the portable device 20, the portable device 20 can estimate its own location in every location.

Accordingly, if a user of the portable device 20 registers a reminder item (notification information) such as "buy a notebook in a convenience store", "stop by the gallery ABC on occasion to visit Kinza town next week", or "check if there is the book DEF upon going to a bookstore" in the portable device 20, the portable device 20 can estimate its own location and notify the reminder item to the user in an appropriate location. For example, the portable device 20 can notify the reminder item "buy a notebook" when the user is in "a convenience store", notify the reminder item "stop by the gallery ABC" when the user is in "Kinza town", or notify the reminder item "check if there is the book DEF" when the user is in "a bookstore".

However, if the base station information of the base stations which are installed in all places is stored in the portable device 20, a large storage capacity and a large-scale hardware are necessary for the portable device 20. Further, the portable device 20 does not necessarily store the base station information of the base stations which are installed in all places in order to notify the reminder item to a user in an appropriate location as described above.

In view of the foregoing, the location notification system 1 of this embodiment has been invented. In the location notification system 1 according to the embodiment, the base station information of the base stations which are installed in a wide range of places is stored in the PC 10, and the necessary base station information which is selected from the base station information that is stored in the PC 10 is stored in the portable device 20. This allows the portable device 20 to perform the processing for notifying a reminder item in an appropriate location and also reduces the hardware scale of the portable device 20. The detailed configuration of the PC 10 and the portable device 20 which constitute the location notification system 1 is described hereinbelow.

Note that FIG. 1 shows the PC 10 as an information processing apparatus and shows the portable device 20 (watch) as a wireless communication apparatus by way of illustration only, and the information processing apparatus and the wireless communication apparatus are not limited to those examples. For example, the information processing apparatus and the wireless communication apparatus may be other information processing apparatus such as a home video processing unit (e.g. a DVD recorder, a videocassette recorder etc.), a PHS (Personal Handyphone System), a portable sound playback unit, a portable video processing unit, a PDA (Personal Digital Assistant), a home game device, and an electrical household appliance.

(2) Description of the First Embodiment of the Present Invention

A first embodiment of the present invention is described hereinafter. Specifically, the configuration, the operation and so on of the PC 10 and the portable device 20 according to the first embodiment of the present invention are described with reference to FIGS. 3 to 11.

Figure 3:
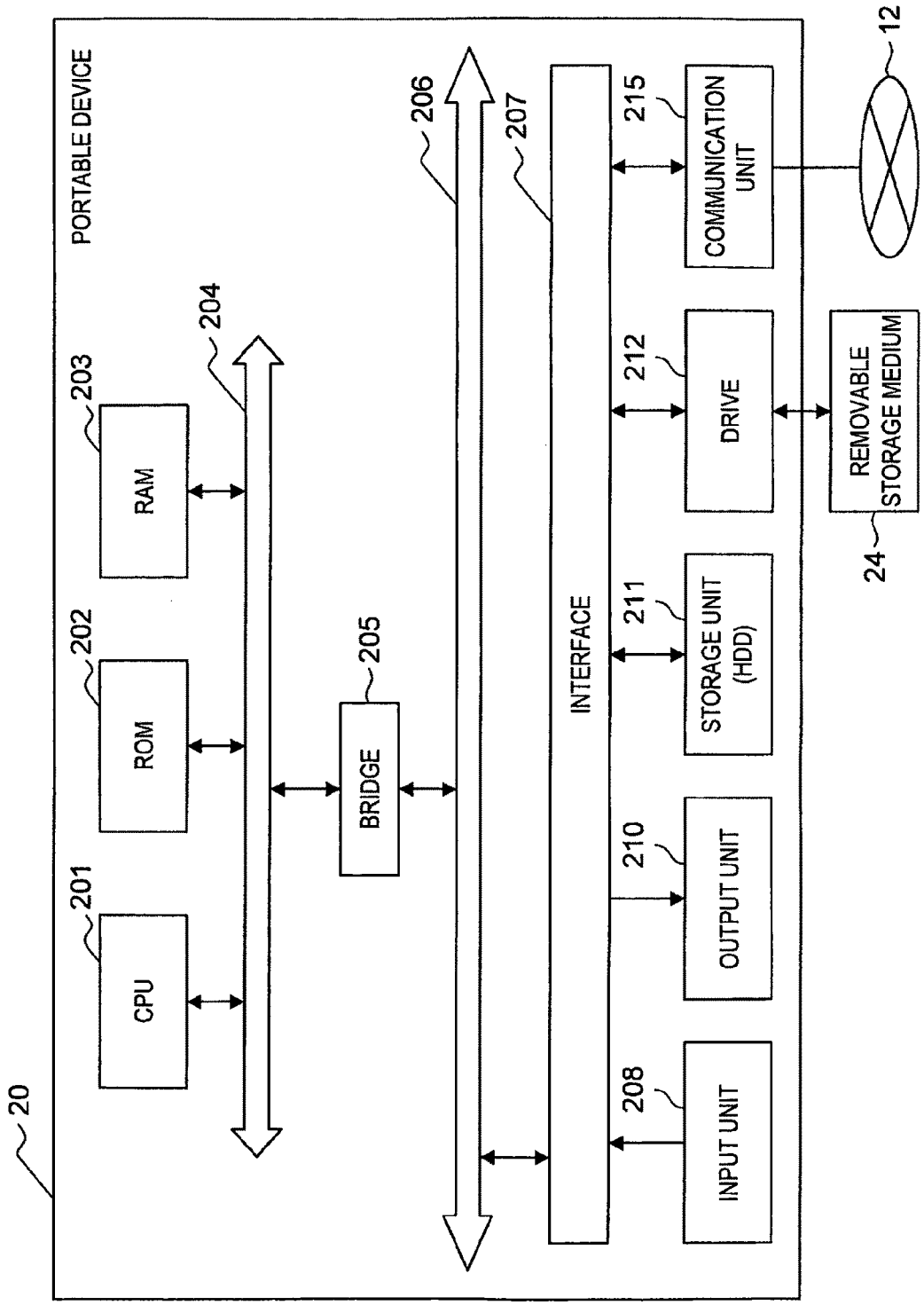
FIG. 3 is a block diagram showing the hardware configuration of a portable device according to the first embodiment of the present invention.

(2-1) Hardware Configuration of the Portable Device According to the First Embodiment of the Present Invention FIG. 3 is a block diagram showing the hardware configuration of the portable device 20. The portable device 20 includes a CPU (Central Processing Unit) 201, a ROM (Read Only Memory) 202, a RAM (Random Access Memory) 203, a host bus 204, a bridge 205, an external bus 206, an interface 207, an input unit 208, an output unit 210, a storage unit (HDD) 211, a drive 212, and a communication unit 215.

The CPU 201 serves as a processing unit and a control unit, and it controls the overall operation in the portable device 20 according to each program. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from each other, and their functions may be implemented by one bus.

The input unit 208 may include an input means for a user to input information, such as a mouse, a keyboard, a touch panel, a button, a microphone, a switch or a lever, and an input control circuit to generate an input signal based on a user input and output it to the CPU 201, for example. A user of the portable device 20 manipulates the input unit 208 to thereby input various data or instruct processing operation to the portable device 20.

The output unit 210 may include a display device such as a CRT (Cathode Ray Tube) display device, an OLED (Organic Light Emitting Display) device, an LCD (Liquid Crystal Display) device or a lamp, and a sound output device such as a speaker or a headphone, for example. The output unit 210 may output a reminder item, for example. Specifically, the display device displays an reminder item by a text or an image. The sound output device converts a reminder item into a sound and outputs it.

The storage unit 211 is a device for data storage that is configured as an example of a storage portion of the portable device 20 according to this embodiment. The storage unit 211 may include a storage medium, a recording device to record data into the storage medium, a reading device to read data from the storage medium, a deleting device to delete data recorded in the storage medium and so on. The storage unit 211 may be an HDD (Hard Disc Drive). The storage unit 211 drives a hard disk and stores a program to be executed by the CPU 201 or various data. The storage unit 211 also stores base station information, a reminder item and so on as described later.

The drive 212 is a reader/writer for a storage medium, and it may be built in the portable device 20 or attached externally. The drive 212 reads information that is recorded on a removable storage medium 24 such as a magnetic disk, an optical disk, a magneto-optical disk or a semiconductor memory which is attached thereto and outputs the information to the RAM 203.

The communication unit 215 may be a communication interface that includes a communication device or the like to establish connection with the communication network 12. The communication unit 215 may be a communication device compatible with a wireless LAN (Local Area Network), a communication device compatible with a wireless USB, or a wire communication device that performs wired communication. The communication unit 215 may receive a signal which is transmitted from the surrounding base station 30 or transmit/receive data such as base station information and a reminder item to/from the PC 10.

The hardware configuration of the portable device 20 is described in the foregoing with reference to FIG. 3. The hardware configuration of the PC 10 may be substantially the same as the hardware configuration of the portable device 20 and thus not described herein.

Figure 4:
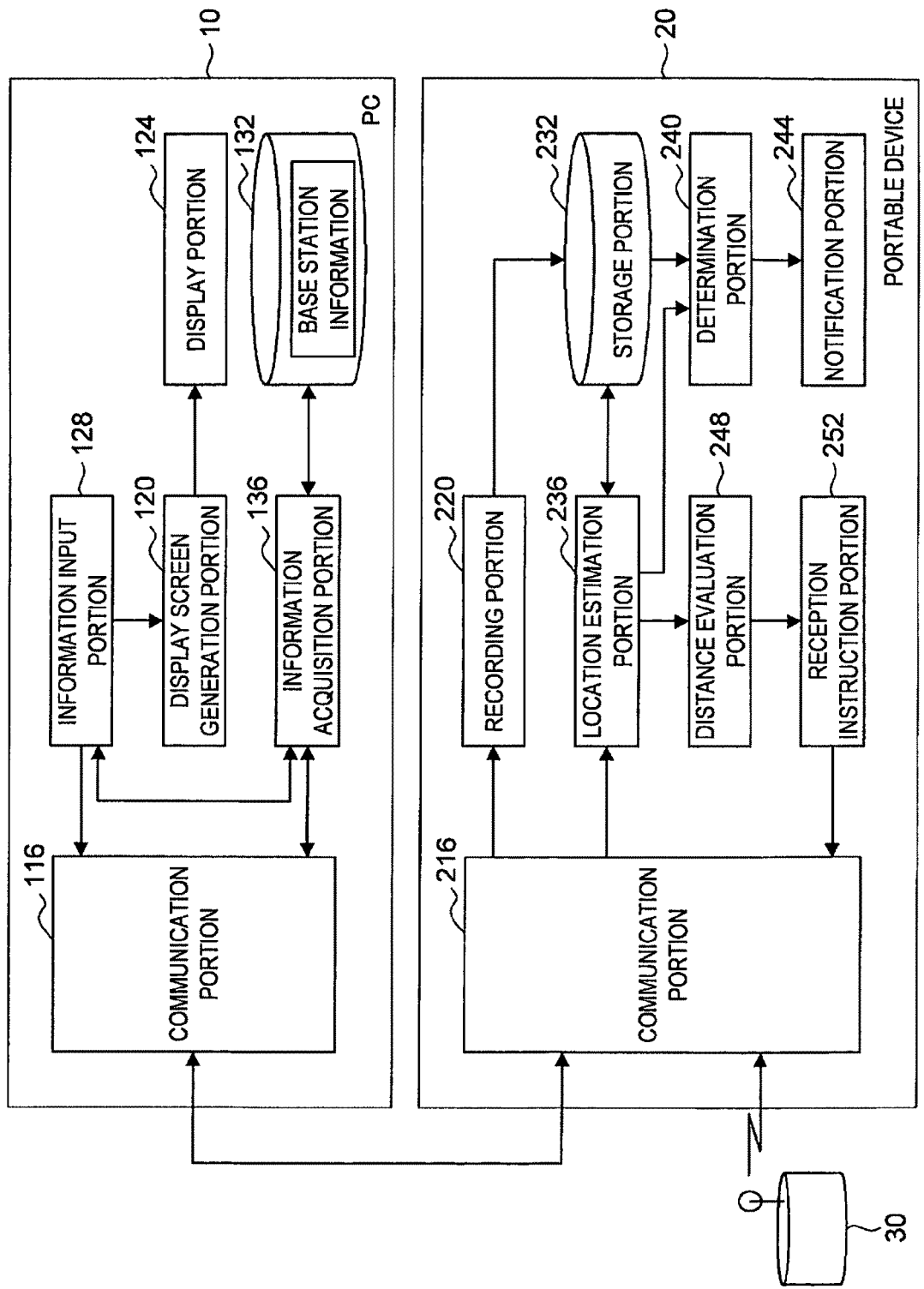
FIG. 4 is a functional block diagram showing the configuration of a PC and a portable device according to the first embodiment.

(2-2) Function of the PC and the Portable Device According to the First Embodiment of the Present Invention FIG. 4 is a functional block diagram showing the configuration of the PC 10 and the portable device 20 according to the embodiment. As shown in FIG. 4, the PC 10 includes a communication portion 116, a display screen generation portion 120, a display portion 124, an information input portion 128, a storage portion 132 and an information acquisition portion 136. The portable device 20 includes a communication portion 216, a recording portion 220, a storage portion 232, a location estimation portion 236, a determination portion 240, a notification portion 244, a distance evaluation portion 248 and a reception instruction portion 252.

The communication portion 116 of the PC 10 is an interface with the portable device 20, and it serves as a transmission portion, a reception portion, an output portion, an input portion and so on which communicate information with the portable device 20. The information which is communicated with the portable device 20 is base station information, a notification condition, a reminder item and so on, for example.

Figure 5:
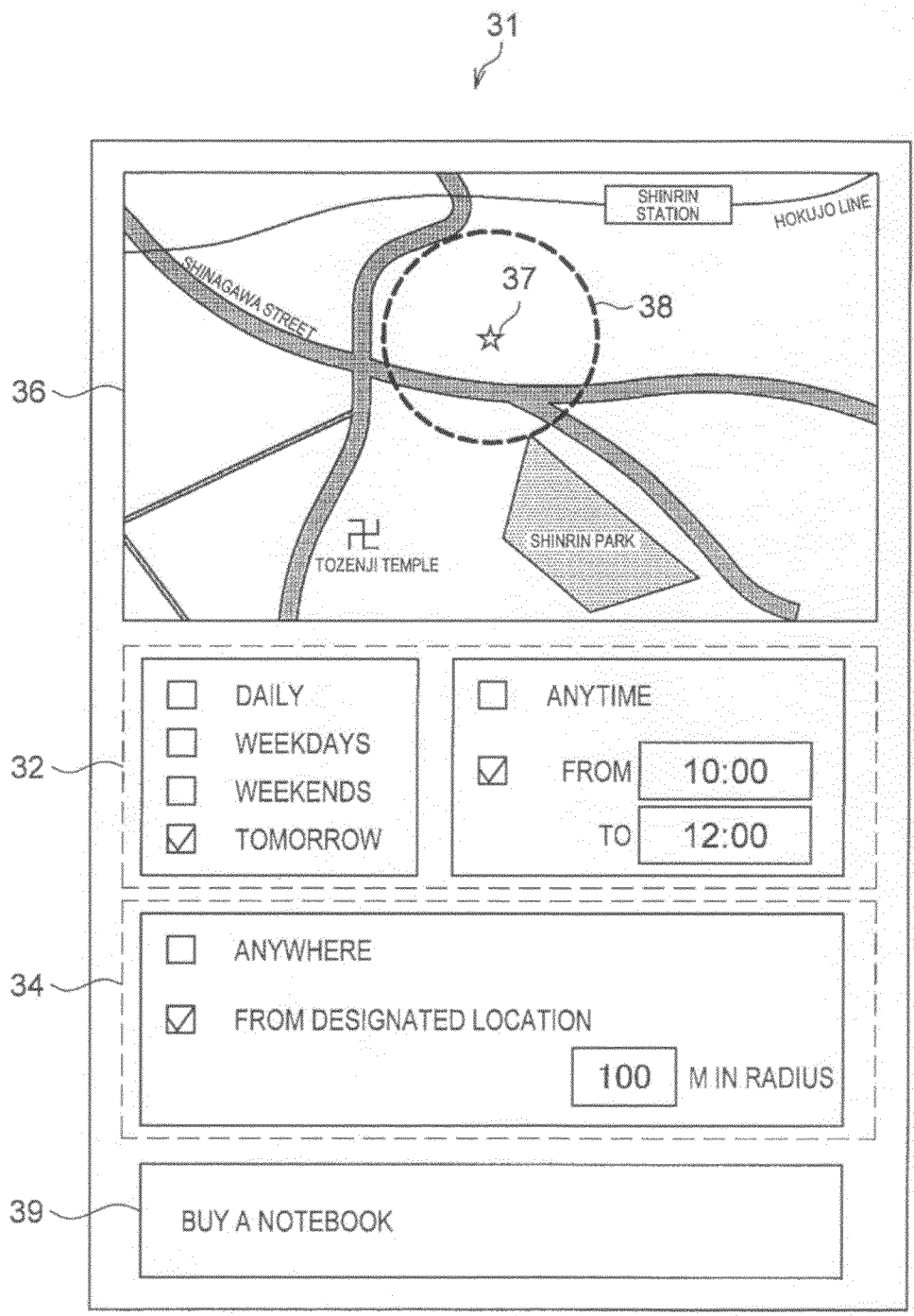
FIG. 5 is an illustration showing an example of a setting screen which is displayed on a display portion.

The display screen generation portion 120 generates a setting screen 31 which is used to set a reminder item and a notification condition for notifying the reminder item. The display portion 124 displays the setting screen 31 which is generated by the display screen generation portion 120. The information input portion 128 is an interface through which a user of the portable device 20 inputs and sets a reminder item and a notification condition on the setting screen 31 which is displayed on the display portion 124, and it serves as a location information input portion. FIG. 5 shows an example of the setting screen 31 for setting a reminder item and a notification condition.

FIG. 5 is an illustration showing an example of the setting screen 31 which is displayed on the display portion 124. As shown in FIG. 5, the setting screen 31 includes a time setting window 32, a location setting window 34, a map window 36 and a reminder item window 39.

The time setting window 32 is a window for setting the time when a reminder item is notified to a user in the portable device 20. In the example shown in FIG. 5, the time setting window 32 includes a display for setting a day such as "daily", "weekdays", "weekends", and "tomorrow" and a display for setting a time period such as "anytime" and "from 10:00 to 12:00". Because "tomorrow" and "from 10:00 to 12:00" are selected in the example of FIG. 5, such time conditions are set as time information, so that a reminder item is notified in the portable device 20 in the period "from 10:00 to 12:00" "tomorrow" if other prescribed conditions are satisfied.

Although FIG. 5 shows the case where the time setting window 32 includes the display for setting a day and the display for setting a time period, the time setting window 32 is not limited thereto. For example, the time setting window 32 may include a display for setting time such as minute, week, month, year and season or a display for setting a period on the basis of the current time.

The location setting window 34 is a window for setting the location where a reminder item is notified to a user in the portable device 20. In the example shown in FIG. 5, the location setting window 34 includes a display for not particularly specifying the location such as "anywhere" and a display for setting the location within a certain range such as "100 m in radius from a designated location". The map window 36 displays the range of "100 m in radius from a designated location" on a map, and it indicates the designated location with a star 37 and indicates the range of 100 m from the star 37 with a dotted line 38. Because the location condition of within the range of "100 m in radius from a designated location" is selected in the example of FIG. 5, such a location condition is set as location information, so that a reminder item is notified in the portable device 20 when the portable device 20 is located within the range of the dotted line 38 (a particular location) from the star 37 and if other prescribed conditions are satisfied.

To specify the position of the star 37, a user may click a desired position on the map window 36 by manipulating the information input portion 128, a user may input the latitude and the longitude by manipulating the information input portion 128, or a user may input an address by manipulating the information input portion 128 and the PC 10 may convert the address into the latitude and longitude. Further, when a user inputs "convenience store" or "bookstore", the location information of the "convenience store" or "bookstore" may be extracted from the location information which is previously registered in association with each facility, so that the location which is indicated by the extracted location information may be specified.

The reminder item window 39 is a window for setting a reminder item to be notified to a user in the portable device 20 when the notification conditions which are set regarding the time information, the location information and so on are satisfied. A user may input and set a desired reminder item by manipulating the information input portion 128, for example. FIG. 5 shows the reminder item window 39 in which the reminder item "buy a notebook" is input.

As described above, if the contents of the setting screen 31 shown in FIG. 5 are set, the portable device 20 notifies a user to "buy a notebook" when it exists in the range of "100 m (the dotted line 38) in radius from a designated location (the star 37)" in the period "from 10:00 to 12:00" "tomorrow".

Back to the description of the configuration of the PC 10 shown in FIG. 4, the storage portion 132 serves as a first memory which stores base station information that associates a base station ID to identify the base station 30 and 30 the location information of the base station 30. An example of the base station information which is stored in the storage portion 132 is described hereinbelow with reference to FIG. 6.

FIG. 6 is an illustration showing an example of the base station information which is stored in the storage portion 132 of the PC 10. As shown in FIG. 6, the storage portion 132 of the PC 10 stores the base station information of the base stations which are installed in given places. In the followings, the symbol that denotes each base station is the base station ID of each base station for convenience of description.

In the example of FIG. 6, the storage portion 132 stores information that the base station 30A' with a base station ID "30A" is installed at "135.001" east longitude and "35.49" north latitude.

Likewise, the storage portion 132 stores the base station information which associates the base station ID of each base station, such as a base station 30B, a base station 30C, a base station 30D, . . . , a base station 30H, a base station 30I, . . . , a base station 30X, a base station 30Y, . . . , with the location information such as the longitude and latitude.

The format of the location information which is stored in the storage portion 132 is not limited to the one using the longitude and latitude. For example, the format may be the one using x and y coordinates, the one using a polar coordinate, or the one using a vector.

The storage portion 132 may be nonvolatile memory such as EEPROM (Electrically Erasable Programmable Read-Only Memory) and EPROM (Erasable Programmable Read-Only Memory), magnetic disks such as hard disk and discoid magnetic disk, optical disks such as CD-R (Compact Disc Recordable)/RW (ReWritable), DVD-R (Digital Versatile Disk Recordable)/RW/+R/+RW/RAM (Random Access Memory) and BD (Blu-ray Disc (registered trademark))-R/BD-RE, or a storage medium such as MO (Magneto Optical) disk.

The information acquisition portion 136 acquires the base station information of the base station 30 which transmits the signal whose radio wave reaching range includes a particular location that is set as the notification location of a reminder item which is input through the information input portion 128 from the base station information which is stored in the storage portion 132. For example, the information acquisition portion 136 may calculate a distance between each base station 30 and a particular location based on the base station information which is stored in the storage portion 132 and acquire the base station information of the base station 30 of which calculated distance is within a radio wave reaching range. The information acquisition portion 136 acquires the base station information shown in FIG. 7, for example, from the storage portion 132. The radio wave reaching range may be a range in which the portable device 20 can receive a radio wave.

FIG. 7 is an illustration showing an example of the base station information which is acquired from the storage portion 132 by the information acquisition portion 136. The information acquisition portion 136 acquires the base station information of the base station which includes a particular location (e.g. longitude 135.002 and latitude 35.46) that is input through the information input portion 128 as shown in FIG. 7 in its radio wave reaching range.

In the example of FIG. 7, the base station information which is acquired from the storage portion 132 by the information acquisition portion 136 contains the base station information of the base station 30A, the base station information of the base station 30B, the base station information of the base station 30I and the base station information of the base station 30X. The base station information which is acquired from the storage portion 132 by the information acquisition portion 136 is transmitted or output to the portable device 20 through the communication portion 116. The communication portion 116 also transmits to the portable device 20 the notification conditions such as location information and time information and the reminder item which are input through the information input portion 128.

The communication portion 216 of the portable device 20 is an interface with the PC 10 and it serves as a base station information input portion, a location information input portion, a time information input portion and a notification information input portion which communicate base station information, notification conditions such as location information and time information, a reminder item and so on with the PC 10. The communication portion 216 also serves as a reception portion which receives a signal which is transmitted from the base station 30.

The base station 30 may be a base station of a wireless LAN (Local Area Network) using WiFi (Wireless Fidelity) based on IEEE802.11 series (e.g. 802.11b, 802.11g etc.).

If the base station 30 is a WiFi base station (access point), for example, the base station 30 may periodically transmit a beaconing signal for informing the surroundings of the existence of the base station 30 in addition to a signal that is transmitted through the wireless communication. The beaconing signal may contain a base station ID as unique base station identification information that is assigned to each base station 30. The portable device 20 can be thereby informed of the existence of the base station 30 that exists in the surrounding area based on the base station ID of the beaconing signal which is received through the communication portion 216.

The recording portion 220 records the base station information, the notification condition, the reminder item and so on which are input from the PC 10 through the communication portion 216 into the storage portion 232. The storage portion 232 serves as a second memory to hold and store the base station information, the notification condition, the reminder item and so on which are recorded by the recording portion 220. Because the base station information which is recorded in the storage portion 232 is selectively acquired by the information acquisition portion 136 from the base station information which is stored in the storage portion 132 of the PC 10, the data amount of the base station information which is recorded in the storage portion 232 is smaller than the data amount of the base station information which is stored in the storage portion 132 of the PC 10.

Like the storage portion 132 of the PC 10, the storage portion 232 of the portable device 20 may be nonvolatile memory such as EEPROM and EPROM, magnetic disks such as hard disk and discoid magnetic disk, optical disks such as CD-R/RW, DVD-R/RW/+R/+RW/RAM and BD (Blu-ray Disc (registered trademark))-R/BD-RE, or a storage medium such as MO disk.

The location estimation portion 236 estimates the existing location of the portable device 20 according to the following expression 1, for example, based on the reception strength of the signal which is transmitted from the surrounding base stations and the base station information which is stored in the storage portion 232.

$$O = \frac{1}{W} \cdot \sum_i (Wi \cdot Ai) \qquad \text{Expression 1}$$

$$Wi = \frac{1}{distS(O, Ai)} \qquad \text{Expression 2}$$

$$W = \sum_i Wi \qquad \text{Expression 3}$$

In the expression 1, Ai indicates the location information of the i-th base station 30 which is recorded in the storage portion 232. Thus, if the base station information is expressed by the longitude and latitude as shown in FIG. 6, the expression 1 is applied for each of the longitude and latitude. Wi indicates a weighting factor which is obtained based on distS (O, Ai) indicating a distance between the portable device 20 and the i-th base station 30 that is estimated from the signal strength. W is the sum total of weighting factors as shown in the expression 3.

Referring to the expression 1, the location information of the base station 30 in which the value of distS (O, Ai) is small is largely reflected in the estimated location O of the portable device 20 at each measurement time. On the other hand, the location information of the base station 30 in which the value of distS (O, Ai) does not largely affect the estimated location O of the portable device 20.

With the above expression 1, the location estimation portion 236 can rationally estimate the location information of the portable device 20. The location estimation portion 236 can further acquire an address such as "5, C-city, AB-prefecture" based on the estimated location information.

A method of estimating the location of the portable device 20 is not limited to the one using the above expression 1. For example, the location of the base station 30 which transmits the signal whose reception strength in the portable device 20 is highest may be estimated as the location of the portable device 20. Alternatively, the location that is at the center of the base stations which transmit the signal whose reception strength in the portable device 20 is a predetermined threshold or higher may be estimated as the location of the portable device 20. Further, the location that is at the center of the base stations which transmit the signal whose reception strength in the portable device 20 is ranked in the top certain percents, such as the top 10%, 20% etc., may be estimated as the location of the portable device 20. Furthermore, the location that is at the center of the base stations which transmit the signal whose reception strength in the portable device 20 is ranked in certain places, such as the top 5th place, 10th place etc., may be estimated as the location of the portable device 20.

FIG. 8 is an illustration showing an example of the reception strength of the signals which are received from the surrounding base stations 30 by the portable device 20. FIG. 8 shows the case where the portable device 20 receives the signals which are transmitted from the base station 30B, the base station 30F, . . . , the base station 30I, the base station 30J, . . . , and the base station 30X. In this case, the location estimation portion 236 can estimate the location of the portable device 20 based on the base station information of the base station 30B, the base station information of the base station 30I and the base station information of the base station 30X which is stored in the storage portion 232.

The determination portion 240 determines whether the portable device 20 exists in the particular location which is specified by the notification condition based on a result of estimating the location of the portable device 20 by the location estimation portion 236. For example, when the location estimation portion 236 estimates location information, the determination portion 240 determines whether the estimated location information corresponds to a particular location.

In order for the location estimation portion 236 to estimate the location of the portable device 20 by the location estimation method as described above, it is necessary that the storage portion 232 stores the base station information of the base station from which the signal received by the portable device 20 is transmitted. Specifically, if the base station from which the signal received by the portable device 20 is transmitted does not correspond to any of the base stations whose base station information is stored in the storage portion 232, the portable device 20 fails to estimate its own location. Thus, when the location estimation portion 236 fails to estimate the location of the portable device 20, it means that the portable device 20 does not exist in a particular specified location. Accordingly, if the location of the portable device 20 is not estimated by the location estimation portion 236, the determination portion 240 determines that the portable device 20 does not exist in a particular location.

The determination portion 240 may determine whether the portable device 20 exists in a particular location without using a result of estimating the location of the portable device 20 by the location estimation portion 236. For example, the determination portion 240 may determine that the portable device 20 exists in a particular location when the base station which corresponds to the base station information stored in the storage portion 232 is included in the base station from which the signal received by the portable device 20 is transmitted, and determine that the portable device 20 does not exist in a particular location when the base station which corresponds to the base station information stored in the storage portion 232 is not included in the base station from which the signal received by the portable device 20 is transmitted. The determination portion 240 further determines whether other notification conditions such as time information are satisfied in addition to the location of the portable device 20.

The notification portion 244 serves as a notification processing portion which notifies a reminder item which is stored in the storage portion 232 to a user according to a determination result by the determination portion 240. For example, the notification portion 244 can notify the reminder item shown in FIG. 9 to a user when the portable device 20 exists in a particular location and a time condition is satisfied.

FIG. 9 is an illustration showing an example of the notification of the reminder item which is notified by the notification portion 244. As shown in FIG. 9, the notification portion 244 can notify the reminder item to a user by displaying the text "You are arrived at the designated location. Please remember to buy a notebook". A method of notifying a reminder item is not limited to display, and it may be notified by sound.

Further, the notification portion 244 may notify a reminder item when the portable device 20 does not exist in a particular location. For example, if a home is set as a particular location, the notification portion 244 can notify the reminder item "Do not forget to bring the passport" when the portable device 20 is moved away from the home.

The reception instruction portion 252 instructs the communication portion 216 to receive the signal which is transmitted from the surrounding base station 30. For example, the reception instruction portion 252 may instruct the communication portion 216 to receive the signal at predetermined intervals. This setting eliminates the necessity for the communication portion 216 to operate at all times, thereby reducing the power consumption in the portable device 20.

Generally, as a distance between the location of the portable device 20 and a particular location is larger, a time that is necessary for the portable device 20 to reach the particular location is longer. Thus, the frequency that the reception instruction portion 252 instructs the communication portion 216 to receive the signal may be variable in accordance with a distance between the location of the portable device 20 and a particular location.

A distance between the location of the portable device 20 and a particular location may be evaluated by the distance evaluation portion 248 based on the estimation result of the location of the portable device 20 which is estimated by the location estimation portion 236 and the location information of the particular location which is included in the notification condition that is stored in the storage portion 232.

This configuration further reduces the power consumption in the portable device 20 while maintaining the accuracy of determination as to whether the portable device 20 exists in a particular location.

The configuration of the PC 10 and the portable device 20 according to the first embodiment is described in the foregoing. A wireless communication method which is performed in the PC 10 and the portable device 20 according to the embodiment is described hereinafter.

Figure 10:
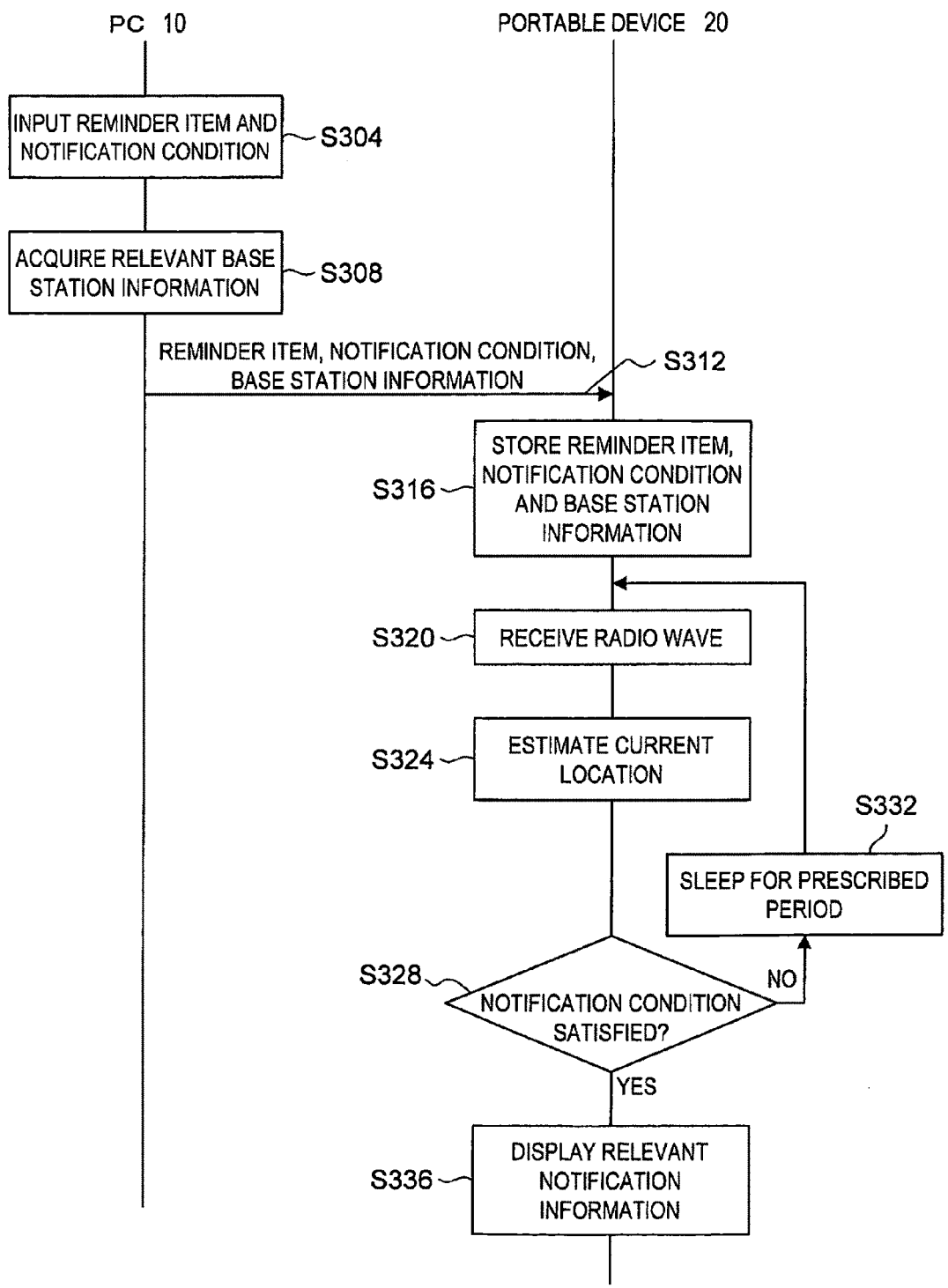
FIG. 10 is a flowchart showing the flow of a wireless communication method which is executed in a PC and a portable device according to the first embodiment.
Figure 11B:
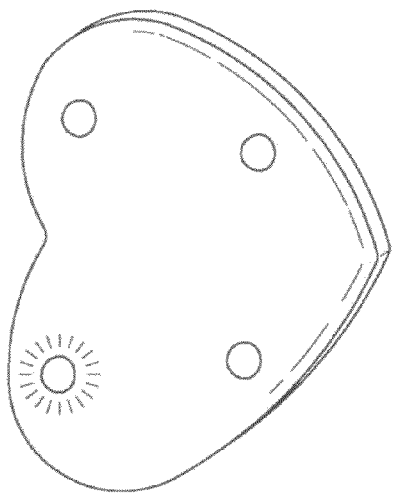
FIG. 11 is an illustration showing another example of the configuration of a wireless communication apparatus.
Figure 11D:
Figure 11A:
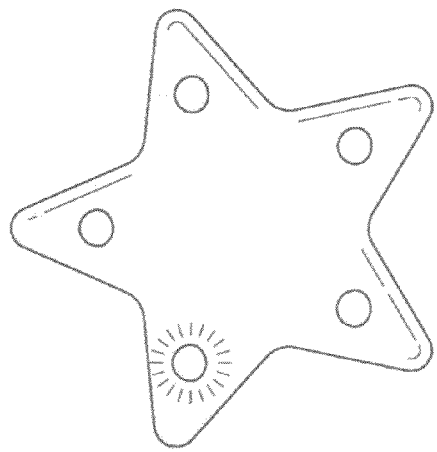
Figure 11C:
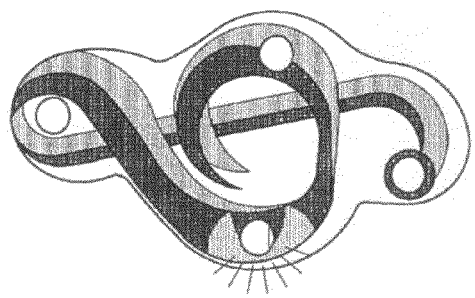

(2-3) Wireless Communication Method According to the First Embodiment of the Present Invention FIG. 10 is a flowchart showing the flow of the wireless communication method which is performed in the PC 10 and the portable device 20 according to the embodiment. First, in the PC 10, a user inputs a reminder item and a notification condition of the reminder item through the information input portion 128 (S304).

Next, the information acquisition portion 136 extracts and acquires the base station information of the base station 30 which transmits the signal whose radio wave reaching range includes a particular location indicated by the location information that is included in the input notification condition from a plurality of pieces of base station information which are stored in the storage portion 132 (S308). Then, the communication portion 116 transmits the reminder item and the notification condition which are input through the information input portion 128 and the base station information which is acquired by the information acquisition portion 136 to the portable device 20 (S312).

The recording portion 220 of the portable device 20 records the reminder item, the notification condition and the base station information which are received from the PC 10 into the storage portion 232 (S316). Then, when the communication portion 216 receives the signal which is transmitted from the surrounding base station 30 (S320), the location estimation portion 236 estimates the location of the portable device 20 based on the signal which is received by the communication portion 216 (S324).

After that, the determination portion 240 determines whether the location of the portable device 20 which is estimated by the location estimation portion 236, the current time or the like satisfies the notification condition which is stored in the storage portion 232 (e.g. whether the portable device 20 exists in a particular location) (S328). If the determination portion 240 determines that it does not satisfy the notification condition which is stored in the storage portion 232, the reception instruction portion 252 outputs a reception instruction to the communication portion 216 after a prescribed period of time (S332).

On the other hand, if the determination portion 240 determines in the step S328 that it satisfies the notification condition which is stored in the storage portion 232, the notification portion 244 notifies the reminder item which is stored in the storage portion 232 in association with the notification condition to a user (S336).

As described above, according to the first embodiment of the present invention, the base station information which is necessary for determining whether the portable device 20 exists in a particular location is selectively recorded in the storage portion 232 of the portable device 20. The data amount of the base station information which is stored in the storage portion 232 of the portable device 20 is thereby reduced, so that the portable device 20 can perform the reminder item notification processing according to the existing location of the portable device 20 with a small hardware scale.

(2-4) Alternative Embodiment of the First Embodiment of the Present Invention

An alternative embodiment of the first embodiment of the present invention is described hereinbelow. In the first embodiment described above, as prescribed notification processing, a prestored reminder item is notified when a watch, which is shown as an example of a wireless communication apparatus, exists in a particular location. However, the notification processing is not limited thereto, and it may notify a user that the wireless communication apparatus exists in a particular location by simply emitting light, vibrating, sounding a siren and so on.

FIG. 11 is an illustration showing other examples of the configuration of the wireless communication apparatus. As described above, the wireless communication apparatus does not necessarily include a display, and it may have a simple hardware configuration as shown in FIG. 11. For example, the wireless communication apparatus may be a star-shaped pin as shown in FIG. 11A, a heart-shaped brooch as shown in FIG. 11B, a G clef-shaped pin as shown in FIG. 11C, or a soccer ball-shaped pin as shown in FIG. 11D.

Further, although the case where the base station information is information which associates a base station ID with location information of the base station 30 is described above, the base station information is not limited to thereto. For example, the base station information may be information which associates a base station ID with a reception strength to indicate radio conditions. This is described in detail hereinbelow.

The signal strength pattern (radio condition) of the signal which is received at a certain location by the portable device 20 from a plurality of base stations is a radio condition that is unique to the location, and there is only a small possibility that the same radio condition is obtained in another location. Thus, if the radio condition of the portable device 20 is acquired, it is possible to estimate the location of the portable device 20 substantially uniquely. The alternative embodiment is proposed in light of the fact that a unique radio condition is obtained in a certain location.

In the alternative embodiment, the storage portion 232 stores the reception strength (radio condition) for each base station 30. The reception strength for each base station 30 may be estimated by the information acquisition portion 136 in the PC 10, which estimates the reception strength for each base station 30 that is received by a particular location which is input through the information input portion 128.

The location estimation portion 236 of the portable device 20 measures the reception strength of the signal which is transmitted from the surrounding base station 30 for each base station 30. The location estimation portion 236 then acquires the radio condition of the portable device 20 which contains the combination of the base station ID and the reception strength.

The determination portion 240 determines whether the radio condition of the portable device 20 which is acquired by the location estimation portion 236 and the radio condition which is stored in the storage portion 232 match with or are similar to each other.

Examples of the technique of determining the similarity between a radio condition A and a radio condition B is described below.

(1) If there is a predetermined number or more of matches between the base station ID which is contained in the radio condition A and the base station ID which is contained in the radio condition B, it is determined that the radio condition A and the radio condition B match or are similar, and if there is not a predetermined number or more of matches between the base station ID which is contained in the radio condition A and the base station ID which is contained in the radio condition B, it is determined that the radio condition A and the radio condition B do not match or are not similar.

(2) If there is a predetermined number or more of matches between the base station ID with a predetermined level or higher reception strength which is contained in the radio condition A and the base station ID with a predetermined level or higher reception strength which is contained in the radio condition B, it is determined that the radio condition A and the radio condition B match or are similar, and if there is not a predetermined number or more of matches between the base station ID with a predetermined level or higher reception strength which is contained in the radio condition A and the base station ID with a predetermined level or higher reception strength which is contained in the radio condition B, it is determined that the radio condition A and the radio condition B do not match or are not similar.

(3) A coefficient of correlation in the sets of the base station ID and the reception strength between the radio condition A and the radio condition B is calculated, and if the coefficient of correlation is a set value or higher, it is determined that the radio condition A and the radio condition B match or are similar, and if the coefficient of correlation is a set value or lower, it is determined that the radio condition A and the radio condition B do not match or are not similar.

(4) The determination on the similarity between the radio condition A and the radio condition B can be performed using other arbitrary techniques and standards.

If the determination portion 240 determines that the radio condition of the portable device 20 which is acquired by the location estimation portion 236 and the radio condition which is stored in the storage portion 232 match or are similar, the notification portion 244 notifies the reminder item which is stored in association with the radio condition in the storage portion 232.

This configuration eliminates the process of estimating the location of the portable device 20 based on the reception strength of the signal which is received from the surrounding base station 30 by each portable device 20. It is thereby possible to reduce the capacity that is necessary for the portable device 20.

The location of the portable device 20 may be estimated using GPS or a signal which is transmitted from a base station of a cellular phone. However, when using GPS, it is necessary to run a GPS receiving function at all times, which causes high power consumption. On the other hand, when using the WiFi wave, it is only necessary to activate a signal receiving function according to need, thus enabling lower power consumption. Further, in the technique of using a base station of a cellular phone, the accuracy of the location estimation is low with the current state of the art.

Alternatively, when a user bookmarks a certain Web page through the information input portion 128, the information acquisition portion 136 may convert the address which is contained in the Web page into the latitude and longitude information and acquire the base station information of the base station 30 which transmits the signal that includes the location designated by the latitude and longitude information within its radio wave reaching range from the storage portion 132, and the communication portion 116 may transmit the acquired base station information to the portable device 20. Consequently, the base station information which enables the estimation of the location that is designated by the address contained in the certain Web page is stored in the storage portion 232 of the portable device 20, so that prescribed notification processing is performed when the portable device 20 reaches the location that is designated by the address contained in the Web page.

(3) Description of the Second Embodiment of the Present Invention

A second embodiment of the present invention is described hereinafter. A "stamp rally" of train, which gives an award to a person who has put a stamp that is placed in each station of a line on a given stamp book at all predetermined stations, is widely spread. In such stamp rally, the stamp which is put on the stamp book has a location verification function that indicates that a user has visited the station where the stamp is placed.

The above location verification function can be achieved with the use of the wireless communication apparatus. For example, there may be a method that the wireless communication apparatus estimates its own location based on the signal that is transmitted from the surrounding base station, transmits the estimated location to a predetermined point distribution server and receives an award according to the location from the point distribution server. However, in order for the wireless communication apparatus to estimate its own location, it is necessary to store the location information of the surrounding base stations and to perform the process of calculating its own location based on the signal which is transmitted from the surrounding base station and the location information of the base station which is stored therein. This causes an increase in the storage capacity and the processing capacity that are necessary for the wireless communication apparatus.

In view of the foregoing, the second embodiment of the present invention has been invented. According to the second embodiment of the present invention, it is possible to give an award to a wireless communication apparatus (or a user) according to the current or past location of the wireless communication apparatus without storing base station information in the wireless communication apparatus.

For example, a wireless communication system 2 according to the second embodiment of the present invention includes a point distribution server and a wireless communication apparatus which is capable of communication with the point distribution server. The wireless communication apparatus includes a reception portion which receives a signal that is transmitted from the surrounding base station, a radio condition acquisition portion which acquires a radio condition that is a reception strength of the signal received by the reception portion for each base station, and a transmission portion which transmits the radio condition that is acquired by the radio condition acquisition portion to the point distribution server. The point distribution server includes a storage portion which previously stores a radio condition and prescribed award information in association with each other, a radio condition determination portion which determines if the radio condition that is received from the wireless communication apparatus and the radio condition that is stored in the storage portion match or are similar, and an award distribution portion which distributes the award information that is stored in the storage portion in association with the radio condition which is determined to match or be similar to the radio condition that is received from the wireless communication apparatus by the radio condition determination portion to the wireless communication apparatus. A specific example of the wireless communication system 2 according to the embodiment is described hereinafter. The elements of the wireless communication system 2 of the embodiment are similar to those described in the first embodiment in many ways, and a difference is mainly described hereinbelow.

Figure 12:
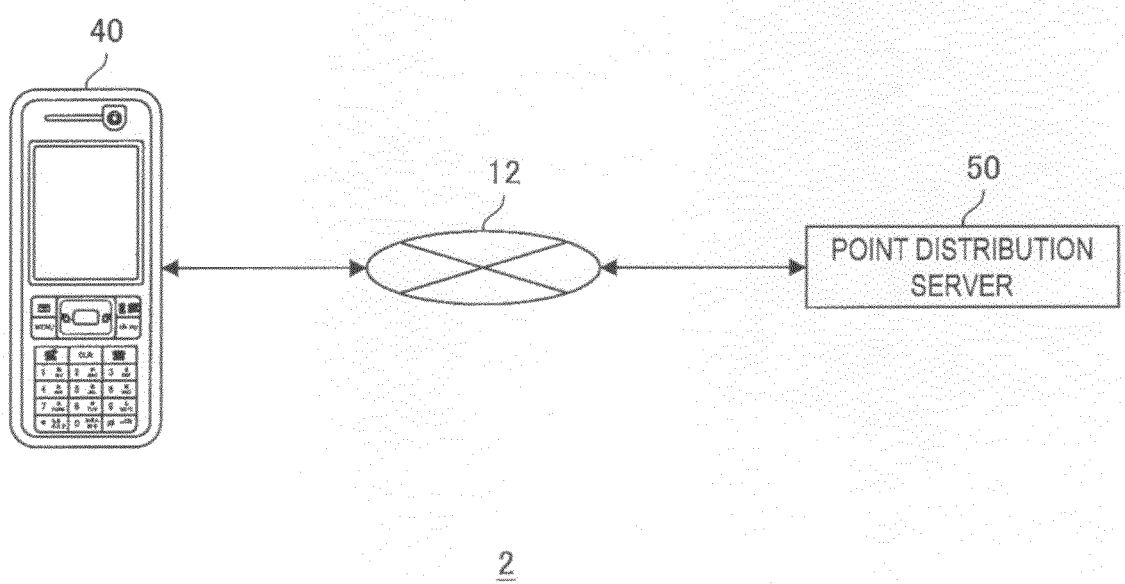
FIG. 12 is an illustration showing an example of the configuration of a wireless communication system according to a second embodiment of the present invention.

FIG. 12 is an illustration showing an example of the configuration of the wireless communication system 2 according to the second embodiment of the present invention. As shown in FIG. 12, the wireless communication apparatus 2 of the embodiment includes a cellular phone 40 as an example of the wireless communication apparatus, and a point distribution server 50 which is connected with the cellular phone 40 through a communication network 12.

Although FIG. 12 shows the cellular phone 40 as an example of the wireless communication apparatus, the wireless communication apparatus is not limited thereto as long as it has a wireless communication function. For example, the wireless communication apparatus may be other information processing units such as a PC, a PHS, a portable sound playback unit, a portable video processing unit, a PDA, a portable game device, and an electrical household appliance.

The communication network 12 may include a wire cable such as a copper wire or a fiber-optic cable, a data transmission line such as a radio wave, or a data relay station such as a router or a base station to control communication. The specific function of the cellular phone 40 and the point distribution server 50 is described hereinafter with reference to FIGS. 13 and 14.

Figure 13:
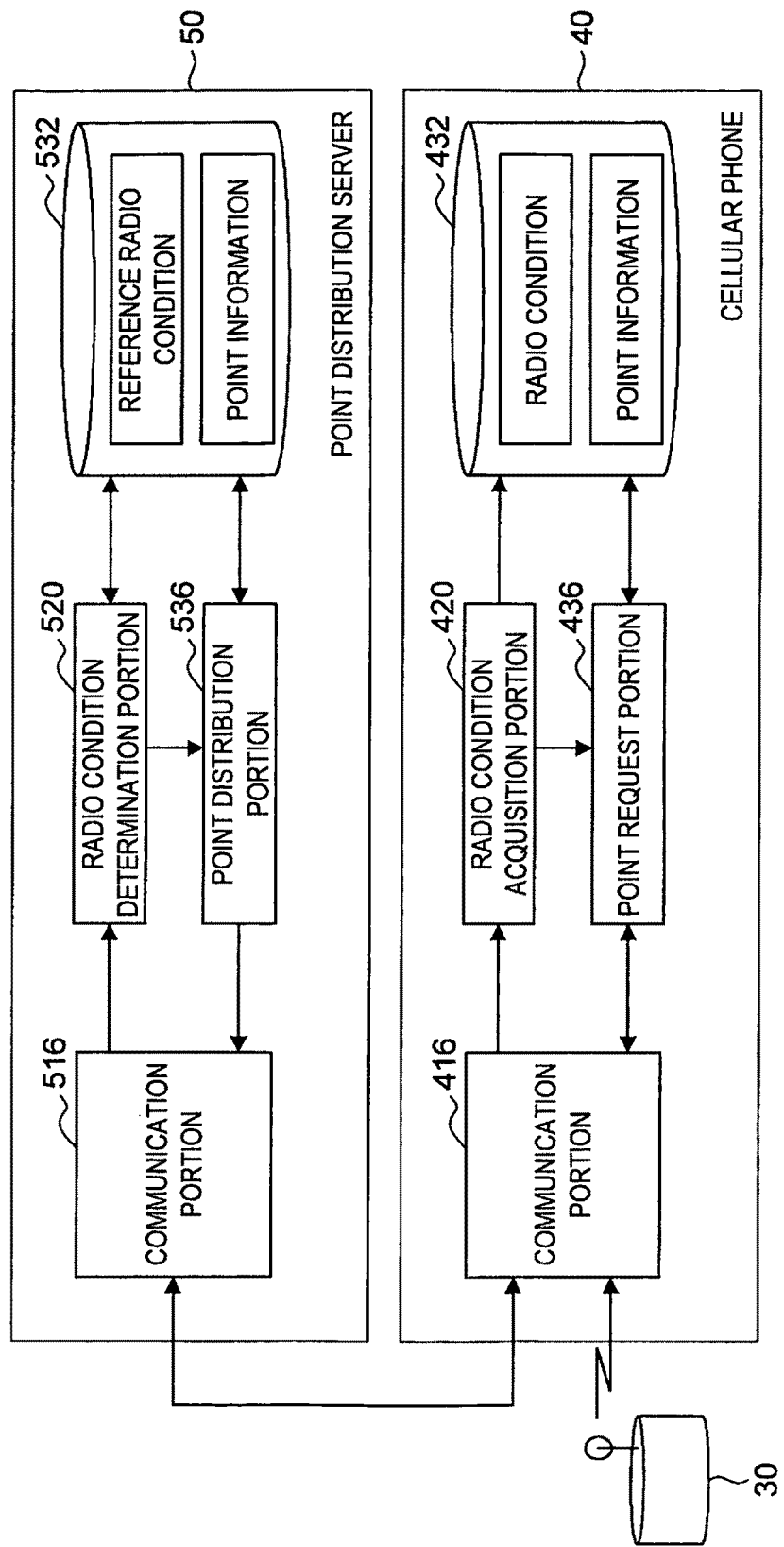
FIG. 13 is a functional block diagram showing the configuration of a cellular phone and a point distribution server according to the second embodiment.

(3-1) Function of the Point Distribution Server and the Cellular Phone According to the Second Embodiment of the Present Invention FIG. 13 is a functional block diagram showing the configuration of the cellular phone 40 and the point distribution server 50 according to the second embodiment. The cellular phone 40 includes a communication portion 416, a radio condition acquisition portion 420, a storage portion 432 and a point request portion 436. The point distribution server 50 includes a communication portion 516, a radio condition determination portion 520, a storage portion 532 and a point distribution portion 536.

The communication portion 416 of the cellular phone 40 serves as a transmission portion and a reception portion which communicate a radio condition and a point (award) with the point distribution server 50. The communication portion 416 can also receive a signal which is transmitted from the surrounding base station 30.

The radio condition acquisition portion 420 measures the strength of the signal which is received from the surrounding base station by the communication portion 416 and acquires a radio condition. For example, the radio condition acquisition portion 420 acquires the radio condition as shown in FIG. 8, for example. The radio condition acquisition portion 420 then records the acquired radio condition into the storage portion 432. The storage portion 432 stores and holds the radio condition which is acquired by the radio condition acquisition portion 420.

The point request portion 436 transmits the radio condition which is stored in the storage portion 432 as a point distribution request to the point distribution server 50 according to user operation, for example. The point request portion 436 may transmit the radio condition which is acquired by the radio condition acquisition portion 420, rather than the radio condition which is once stored in the storage portion 432, to the point distribution server 50.

The communication portion 516 of the point distribution server 50 is an interface which communicates a radio condition and a point with the cellular phone 40. The radio condition determination portion 520 determines whether a reference radio condition which matches or is similar to the radio condition that is received from the cellular phone 40 by the communication portion 516 is stored in the storage portion 532. The storage portion 532 stores a reference radio condition and point information in association with each other. An example of the information which is stored in the storage portion 532 is described hereinafter with reference to FIG. 14.

The determination on the matching or similarity of a plurality of radio conditions may be performed based on whether their base station IDs match or are similar as described above. Thus, the radio condition may be information which simply contains a base station ID.

FIG. 14 is an illustration showing an example of the information which is stored in storage portion 532. The storage portion 532 stores a reference radio condition and point information in association with each other. Specifically, the point information "Star books 5P" is associated with the reference radio condition in which the signal transmitted from the base station 30A with the base station ID "30A" has the reception strength "−90 Dbm", the signal transmitted from the base station 30B with the base station ID "30B" has the reception strength "−70 Dbm", the signal transmitted from the base station 30C with the base station ID "30C" has the reception strength "−80 Dbm", and the signal transmitted from the base station 30D with the base station ID "30D" has the reception strength "−75 Dbm". Likewise, the location names "First grill 4P" and "Seven-ten 2P" are respectively associated with the radio conditions which contain a combination of a plurality of base station IDs and reception strengths.

The point distribution portion 536 distributes a point to the cellular phone 40 based on the point information which is associated with the reference radio condition that is determined by the radio condition determination portion 520 to match or be similar to the radio condition received from the cellular phone 40. For example, if the radio condition determination portion 520 determines that the radio condition received from the cellular phone 40 matches or is similar to the reference radio condition of the Star books, the point distribution portion 536 distributes 5 points to the cellular phone 40. The point may be stored in the point distribution server 50 for each cellular phone 40. The point which is distributed to the cellular phone 40 may be used for a discount in a prescribed store.

(3-2) Point Distribution Method According to the Second Embodiment of the Present Invention The flow of the point distribution method which is performed in the cellular phone 40 and the point distribution server 50 according to the embodiment is described hereinafter.

FIG. 15 is an illustration showing the point distribution method which is performed in the cellular phone 40 and the point distribution server 50 according to the embodiment. First, the cellular phone 40 receives a signal (radio wave) which is transmitted from the surrounding base station 30 (S600). Then, the cellular phone 40 stores the radio condition which is acquired based on the received signal into the storage portion 432 (S610).

After that, the cellular phone 40 transmits the radio condition which is stored in the storage portion 432 to the point distribution server 50 as a point distribution request (S620). The radio condition determination portion 520 of the point distribution server 50 determines whether the radio condition which is received from the cellular phone 40 matches or is similar to the reference radio condition which is prestored in the storage portion 532 (S630). Then, the point distribution server 50 distributes a point to the cellular phone 40 based on the point information which is stored in the storage portion 532 in association with the reference radio condition that is determined to match or be similar to the radio condition received from the cellular phone 40 (S640).

The cellular phone 40 stores the point which is distributed from the point distribution server 50 to the storage portion 432 (S650), and a user of the cellular phone 40 can use the point which is stored in the storage portion 432 when desired (S660).

(4) Summary

As described in the foregoing, according to the first embodiment of the present invention, the information acquisition portion 136 acquires the base station information of the base station 30 which transmits the radio wave that reaches a particular location indicated by the position information that is input to the information input portion 128. The base station information may contain a base station ID, location information indicating the location of the base station 30 and so on. Further, the information acquisition portion 136 acquires the base station information of the base station 30 which transmits the radio wave that reaches a particular location from the storage portion 132 which stores a plurality of pieces of base station information. Then, the communication portion 116 outputs the base station information which is acquired by the information acquisition portion 136 to the portable device 20. The base station information of the base station 30 which transmits the radio wave whose reaching range includes a particular location is input to the communication portion 216 of the portable device 20, and the recording portion 220 records the base station information into the storage portion 232.

Further, the determination portion 240 determines whether the portable device 20 exists in a particular location based on the radio wave which is transmitted from the surrounding base station 30 and the base station information which is stored in the storage portion 232. For example, the determination portion 240 estimates the location of the portable device 20 based on the radio wave which is transmitted from the surrounding base station 30 and the base station information which contains the location information of each base station 30 which is stored in the storage portion 232, and determines whether the estimated location is a particular location. Then, the notification portion 244 performs prescribed notification processing based on the determination result whether the portable device 20 exists in a particular location by the determination portion 240. For example, when the determination portion 240 determines that the portable device 20 exists in a particular location, the notification portion 244 notifies a user of the portable device 20 that the portable device 20 exists in a particular location.

The base station information which is input to the communication portion 216 is selectively acquired by the information acquisition portion 136 from the storage portion 132 of the PC 10 which stores a plurality of pieces of base station information. Thus, the base station information which is necessary to determine whether the portable device 20 exists in a particular location is selectively recorded in the storage portion 232 of the portable device 20. The data amount of the base station information which is stored in the storage portion 232 of the portable device 20 is thereby reduced, so that the portable device 20 can perform prescribed notification processing according to the existing location of the portable device 20 with a small hardware scale.

Further, according to the second embodiment of the present invention, an award is given to the cellular phone 40 (or a user) according to the current or past location of the cellular phone 40 without storing base station information in the cellular phone 40. This reduces a hardware scale such as a memory that is necessary for the cellular phone 40.

It should be understood by those skilled in the art that various modifications, combinations, sub-combinations and alterations may occur depending on design requirements and other factors insofar as they are within the scope of the appended claims or the equivalents thereof.

For example, although the PC 10 and the portable device 20 are separated in the first embodiment, the present invention is not limited thereto. For example, the functions of the PC 10 and the portable device 20 may be implemented in one hardware. In this case, a function which corresponds to the storage portion 132 may be placed outside the hardware, so that a function which corresponds to the information acquisition portion 136 acquires necessary base station information from the function which corresponds to storage portion 132 placed outside.

Further, it is not necessary to perform each step in the process of the PC 10, the portable device 20, the cellular phone 40 and the point distribution server 50 in chronological order according to the sequence shown in the sequence chart, and the processing which is performed in parallel or individually (e.g. parallel processing or object processing) may be included.

Furthermore, it is possible to create a computer program that causes the hardware such as CPU, ROM or RAM which are built in the PC 10, the portable device 20, the cellular phone 40 or the point distribution server 50 to perform the equal function to each configuration of the PC 10, the portable device 20, the cellular phone 40 or the point distribution server 50 described above. Further, a storage medium which stores such the above computer program may be provided.

What is claimed is:

1. An information processing apparatus connected with a portable wireless communication apparatus capable of receiving a radio wave containing a first base station ID transmitted from a first base station of wireless communication, comprising:
   a location information acquisition portion to acquire location information, input by a user, indicating a given location other than a location of a base station;
   a base station information acquisition portion to acquire base station information, containing a second base station ID, of a second base station transmitting a radio wave having a wave reaching range including the given location, from a first memory storing a plurality of pieces of base station information of base stations; and
   an output portion to output the base station information acquired by the base station information acquisition portion to the portable wireless communication apparatus.

2. The information processing apparatus according to claim 1, further comprising a notification information acquisition portion configured to acquire notification information associated with the given location.

3. The information processing apparatus according to claim 2, wherein the notification information comprises a reminder associated with the given location, for reminding the user to take an action at the given location.

4. The information processing apparatus according to claim 2, wherein the notification information comprises time information associated with the given location, the time information indicating a time.

5. The information processing apparatus according to claim 4, wherein the notification information comprises a reminder associated with the given location, for reminding the user to take an action at the given location at the time.

6. A non-transitory computer-readable medium storing a program which, when executed by a computer, causes the computer to serve as an information processing apparatus connected with a portable wireless communication apparatus capable of receiving a radio wave containing a first base station ID transmitted from a first base station of wireless communication, the program causing the computer to:
   receive a user's input of location information indicating a given location other than a location of a base station;
   acquire base station information, containing a second base station ID, of a second base station transmitting a radio wave having a wave reaching range including the given location, from a first memory storing a plurality of pieces of base station information of base stations; and
   output the base station information to the portable wireless communication apparatus.

7. The information processing apparatus according to claim 1, wherein:
   the base station information acquisition portion is configured to acquire radio condition information indicating a reception strength between the given location and the second base station; and
   the output portion is configured to output the radio condition information to the portable wireless communication apparatus.

8. The information processing apparatus according to claim 7, wherein:
   the reception strength between the given location and the second base station is calculated by the information processing apparatus, based on the location information.

9. A method performed by an information processing apparatus connected with a portable wireless communication apparatus capable of receiving a radio wave containing a first base station ID transmitted from a first base station of wireless communication, the method comprising:
   receiving, by the apparatus, a user's input of location information indicating a given location other than a location of a base station;
   acquiring, by the apparatus, base station information, containing a second base station ID, of a second base station transmitting a radio wave having a wave reaching range including the given location, from a first memory storing a plurality of pieces of base station information of base stations; and outputting, by the apparatus, the base station information to the portable wireless communication apparatus.

10. The method of claim 9, further comprising:

acquiring, by the apparatus, radio condition information indicating a reception strength between the given location and the second base station; and outputting, by the apparatus, the radio condition information to the portable wireless communication apparatus.

11. The method of claim 10, further comprising:

calculating, by the apparatus, the reception strength based on the location information.

12. The method of claim 9, further comprising:

acquiring, by the apparatus, time information associated with the given location, the time information indicating a time.

13. The method of claim 12, further comprising:

acquiring, by the apparatus, a reminder associated with the given location, for reminding the user to take an action at the given location at the time.

* * * * *